United States Patent [19]

Bechtel et al.

[11] Patent Number: 5,001,937
[45] Date of Patent: Mar. 26, 1991

[54] OPTICALLY BASED TORSION SENSOR

[75] Inventors: James H. Bechtel, San Diego; Stephen R. Schaefer, Carlsbad, both of Calif.

[73] Assignee: Tacan Corporation, Carlsbad, Calif.

[21] Appl. No.: 432,075

[22] Filed: Nov. 6, 1989

[51] Int. Cl.$^5$ ............................................. G01L 3/12
[52] U.S. Cl. .............................. 73/862.34; 250/231.14
[58] Field of Search ................... 73/862.34; 324/175; 250/231.14

[56] References Cited

U.S. PATENT DOCUMENTS

| 2,586,540 | 2/1952 | Holden | 73/862.34 |
| 3,762,217 | 10/1973 | Hagen | 73/862.34 X |
| 3,871,215 | 3/1975 | Pratt, Jr. et al. | 73/862.34 |
| 4,204,115 | 5/1980 | Boldridge, Jr. | 250/231.14 X |
| 4,525,068 | 6/1985 | Mannava et al. | 73/862.34 X |

FOREIGN PATENT DOCUMENTS

| 126579 | 10/1979 | Japan | 73/862.34 |
| 147350 | 11/1980 | Japan | 324/175 |
| 919421 | 2/1963 | United Kingdom | 324/175 |
| 1395911 | 5/1975 | United Kingdom | 73/862.34 |
| 2093991 | 9/1982 | United Kingdom | 73/862.34 |
| 2125958 | 3/1984 | United Kingdom | 73/862.34 |

Primary Examiner—Charles A. Ruehl
Attorney, Agent, or Firm—Brown, Martin, Haller & McClain

[57] ABSTRACT

This invention concerns devices for optical measurement of torsion of a rotating shaft. The measurement system can readily be installed to monitor existing equipment because it requires only that a band consisting of alternating high and low reflectivity regions be placed on the shaft at the locations to be measured. The band may be applied as an adhesive tape, among other possibilities. One sensor head is located to correspond to each band. Each sensor head projects light onto the corresponding band, then collects the light reflected by the high reflectivity region(s) of the band. The phase displacement between the intensities of the reflected light at two or more sensor heads may be used to determine torsion on the rotating shaft.

22 Claims, 3 Drawing Sheets

OPTICALLY BASED TORSION SENSOR

FIELD OF THE INVENTION

The present invention relates to torsion sensors. More particularly, it relates to optically based torsion sensors.

BACKGROUND OF THE INVENTION

Existing methods of torsion measurement for rotating shafts rely on either contact sensors or magnetic pickup. In these measurements systems, sensors detect phase displacement proportional to the torsion between two or more triggers placed at distinct locations on the shaft. A primary disadvantage of contact torsion sensors is that they suffer wear due to friction. Other disadvantages are that such methods are difficult to retrofit onto existing machines, and they have a limited angular resolution. An example of the magnetic pickup torsion sensing system, described by Troeder (U.S. Pat. No. 4,450,729), utilizes differential magnetic resistor sensors for non-contact measurement. This device still requires retrofitting of toothed wheels onto the shaft. In an alternate embodiment, Troeder et al described inductive sensors instead of magnetic resistors.

When installed upon manufacture of the shaft, the non-contact magnetic pickup or inductive sensor detection systems are practical and fairly reliable at moderate rotation speeds. However, toothed wheels, as described above, are difficult to manufacture so that they are identical to each other, therefore toothed wheel-based devices have limited resolution. Magnetic pick-up detectors are also limited in very high speed applications, and spurious signals may be produced due to operating environment conditions such as electromagnetic interference and high temperatures. Inductive sensors suffer a reduction in signal at very low frequencies based on Faraday's Law, and will also be affected by electromagnetic noise, but are less sensitive to high temperatures.

It is desirable, then, to have a high resolution device which would be easily retrofitted onto existing equipment without substantial modification, and is capable of accurate measurement for both high and low speed applications. Other desirable features of such a device would have high tolerance of adverse environmental conditions such as high temperature, radioactivity, electromagnetic and RF noise, and smoke or fog. It is to this end that the present invention is directed.

SUMMARY OF THE INVENTION

This invention concerns devices for optical measurement of torsion of a rotating shaft. The measurement system can readily be installed to monitor existing equipment because it requires only that a band consisting of alternating high and low reflectivity regions be placed on the shaft at the locations to be measured. The band may be applied as an adhesive tape, among other possibilities. One sensor head is located to correspond to each band. Each sensor head projects light onto the corresponding band, then collects the light reflected by the high reflectivity region(s) of the band. The phase displacement between the intensities of the reflected light at two or more sensor heads may be used to determine torsion on the rotating shaft.

The device for measuring torsion in a rotating shaft comprises a plurality of bands, where each band consists of a series of regions of high and low optical reflectivity which alternate radially with rotation of the shaft. The boundaries between the regions are distinct and are parallel to the shaft. Each band is placed at a location of the shaft at which measurement is desired. One sensor head is placed to correspond to each band. Each sensor head comprises a light source and a first lens through which light is focused onto the band on the shaft, and a second lens which collects light reflected by the high reflectivity regions of the band as the shaft rotates. Reflected light which is collected by the second lens is focused on a detector means, which converts the reflected light into an electrical signal. A micro-processor receives the electrical signals from the detector, and compares the electrical signals to compute and record phase displacement proportional to the torsion in the rotating shaft.

BRIEF DESCRIPTION OF THE DRAWINGS

The features of this invention will be more readily apparent from the following detailed description when read in conjunction with the accompanying drawings in which.

DETAILED DESCRIPTION OF THE PREFERRED EMBODIMENTS

Figure 1:
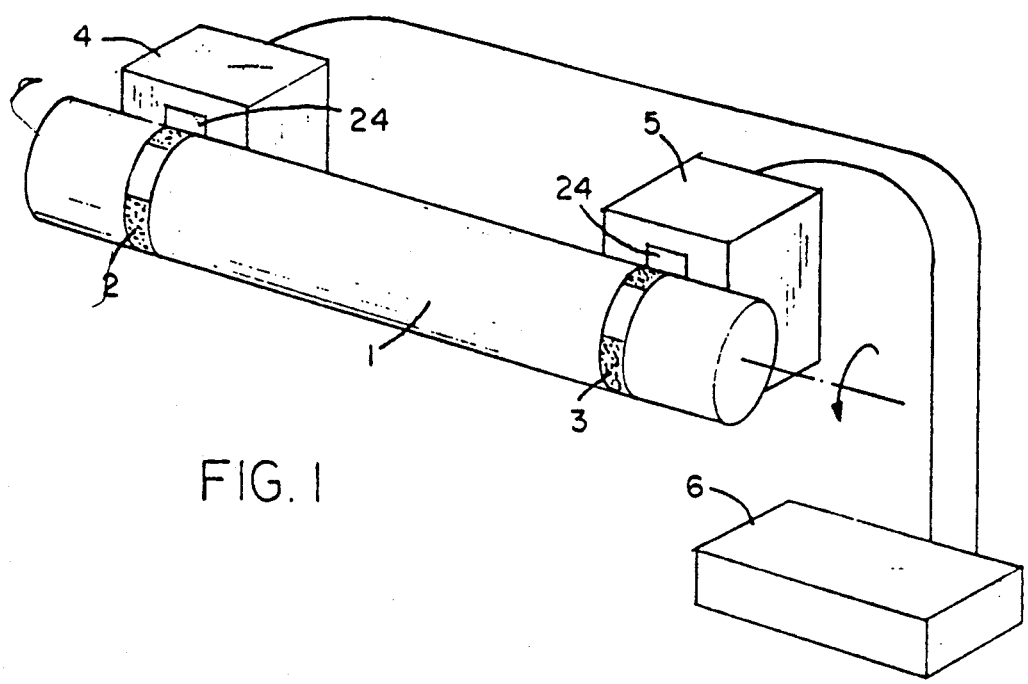
FIG. 1 is a diagrammatic view of the detector system with two sensor heads measuring a rotating shaft.

The invention herein will be most readily understood by reference to the drawings. FIG. 1 illustrates a detection system with its components shown as boxes. Rotating shaft 1 is subjected to an angular twist due to some external load. In order to measure this angular twist, two or more bands consisting of alternating regions of high and low reflectivity are placed on the shaft. These bands may be coated by way of paint or some other deposition, or they may consist of an adhesive tape attached to the shaft. Sensor heads 4 and 5 have diode lasers and photodiode detectors to measure the reflectivity of bands 2 and 3 as the shaft turns. The outputs of sensors 4 and 5 are directed to microcontroller 6 for data collection, data storage and analysis. Microcontroller 6 may be a microcomputer or any other computational device which provides clock signals, counters, means for comparison, and a display or means for driving a display.

Figure 3:
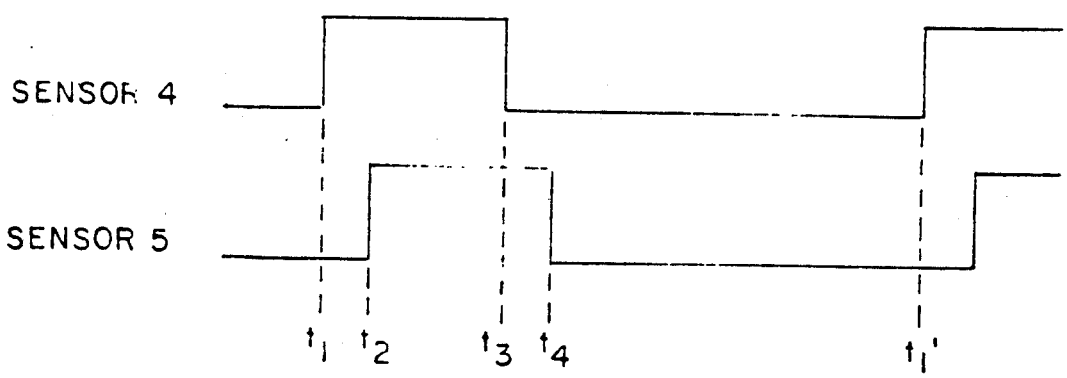
FIG. 3 is a graph showing signals indicating a phase displacement between two sensors.

As the shaft rotates, the optically reflected signal at sensor head 4 and sensor head 5 might appear as in FIG. 3. At time $t_1$, the reflected light, as measured by sensor head 4, increases. At time $t_2$ the reflected light, as measured by sensor head 5, increases. At time $t_3$ the reflected light signal decreases at sensor head 4, and at time $t_4$ the reflected light signal drops at sensor head 5. The duration of the intervals $(t_2-t_1)$ and $(t_3-t_1)$ is determined by the leading and trailing edges of the reflected signals.

The torsion $\phi(t)$ on the shaft can be measured as a function of time by the following method:

$$\phi(t) = N(t_2-t_1)/(t_3-t_1)$$

The normalization constant N is determined solely by the length of the reflective region and the diameter of the shaft. Consequently, if one can measure $(t_2-t_1)$ and $(t_3-t_1)$ at repeated times, $\phi(t)$ can be determined. The expression $(t_2-t_1)$ is expected to change as the relative positions of the bands at the two ends of the shaft change.

If two bands are used, it is not necessary that the lengths of the high reflectivity region be precisely controlled. Thus, the proposed method need not have tight length tolerances. The interval $(t_3-t_1)$ is inversely proportional to the rotation speed of the shaft for a single band, and the interval $(t_2-t_1)$ is additionally determined by the relative angular positions of the two bands.

The low reflectivity region 12 on the band can have a matte black surface and the high reflectivity portion 13 of the surface should be a specular reflector to minimize speckle at the detector. Holographic patterns may also be used to mark regions of high reflectivity to ensure maximum reflection of the laser light. The boundaries 14 between the two reflectivity regions should be sharp to maximize the angular resolution of the system. The boundaries 14 are positioned so that they are parallel to the axis of shaft 1.

Figure 2:
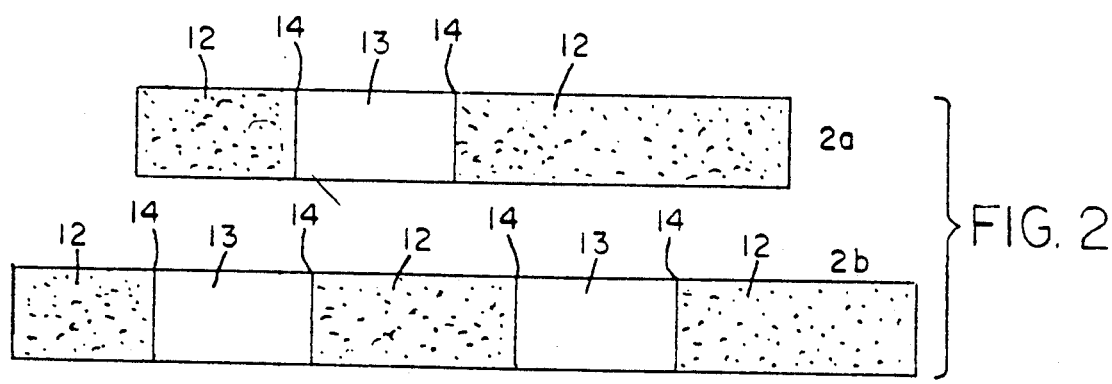
FIG. 2 shows two possible coating schemes for the reflective bands.

FIG. 2 illustrates the alternating high and low reflectivity regions on a band. If only a single high reflectivity region 13 is used on each band, as in FIG. 2a, the resolution may be limited if the shaft is accelerating or decelerating. One solution to this problem is to use a series of high and low reflectivity regions on each band, as in FIG. 2b. The torsion $\phi(t)$ can then be determined for each pair of corresponding regions 12 and 13, and can be computed several times during a single shaft rotation. With a large number of coded reflectivity steps, dynamic effects in angular rotation could be measured. The coatings used to create the bands on the shaft can be paint, evaporation coatings, sputtered films, or other depositions. In the preferred embodiment, a coated tape can have an adhesive backing which can be applied to the shaft to hold the tape to the shaft. It is also possible to use this method without a tape or coating if an appropriate pattern is milled or etched into the shaft.

Figure 4:
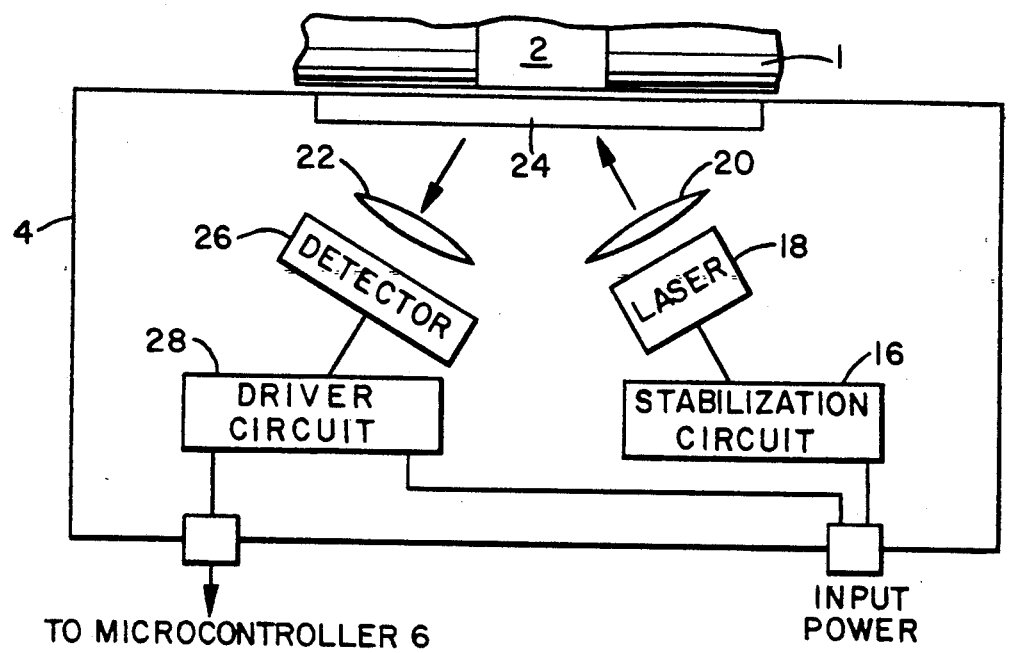
FIG. 4 is a diagrammatic view of the sensor head.

As illustrated in FIG. 1, sensors heads 4 and 5 are identical. Shown in FIG. 4, each sensor head 4 has a light source, such as a diode laser 18, stabilized by stabilization circuit 16 to assure operation with a controlled output power. The laser light is focused by lens 20, through an optical filter 24 onto band 2 fixed on the rotating shaft 1. The optical filter 24 is selected to minimize the transmission of light which is not at the laser wavelength. Filter 24 also protects the optical components inside the sensor head 4. Reflected light is collected by a second lens 22 and is focused on the detector 26. Detector 26 can be a photodiode, phototransistor or other type of photodetector. The output of this detector is directed to a driver circuit 28 which converts the detector output into a signal which is transmitted to the microcontroller 6.

Figure 5:
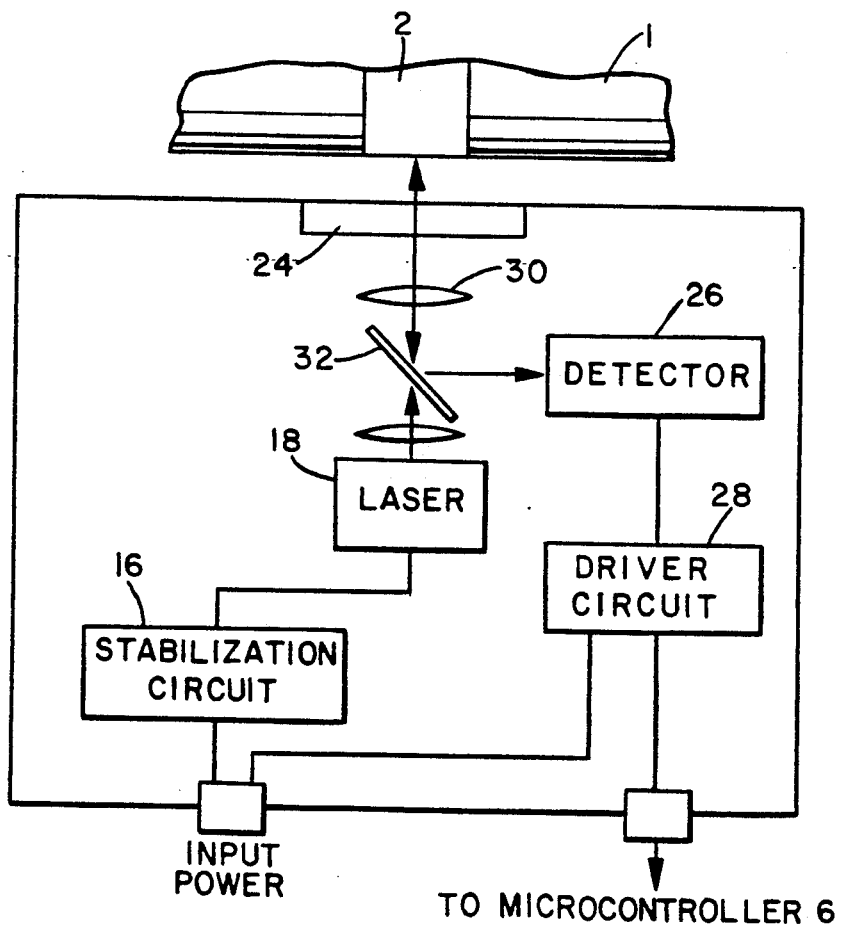
FIG. 5 is a diagrammatic view of a first alternate embodiment of the sensor head, incorporating a beam splitter.

In an alternate embodiment of the sensor head, shown in FIG. 5, the output lens 30 focuses the light onto the rotating shaft 1 and also recollects the reflected light. A beam-splitter 32 directs the collected light to the photodetector 26. All other aspects of this embodiment are the same as the original embodiment.

Figure 6:
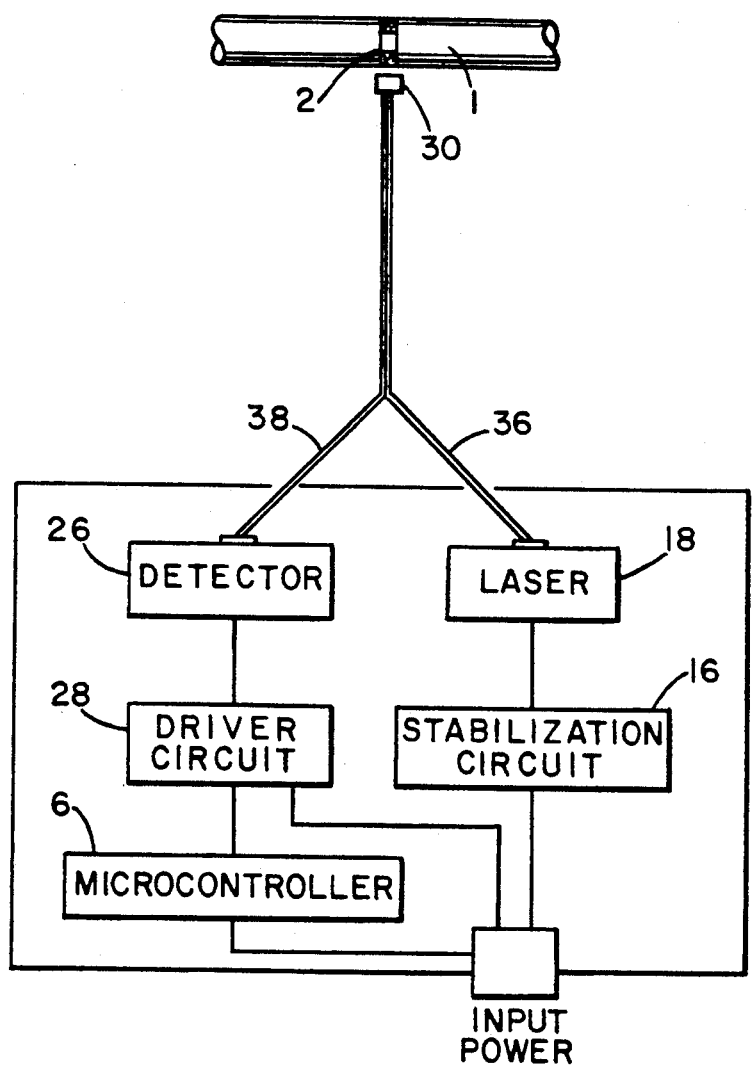
FIG. 6 is a diagrammatic view of a second alternate embodiment of the sensor head, incorporating fiber optics.

In a third embodiment of the sensor head, which will enable the detection system to be used in harsh industrial environments, the sensor head components are located remotely from the shaft while the diode laser signal is transmitted and focused on the band via an optical fiber and through lens 30, as shown in FIG. 6. A single mode fiber 36 may be used to achieve the minimum spot size on the reflecting bands 2. After collection of the reflected light by lens 30, a multimode fiber 38 is used to transmit the reflected light to the detector 26. In this embodiment the sensor head components may be combined in the same remote unit with the microcontroller 6. A two lens configuration may also be used, with one lens for focusing light on the band and a second lens collecting the reflected light. The optical fibers 36 and 38 will allow the detection system to withstand high temperatures, radioactive environments, noise, and electromagnetic or radio frequency interference. The detection system can also be used in environments with some smoke or fog. These conditions will only attenuate the optical beams and will not affect the accuracy of the timing signals unless the smoke or fog is sufficiently thick to completely attenuate the beams.

The accuracy of the device is determined by the timing resolution of the photodetectors and electronics. This is of most concern at high rotational speeds. If one desires an angular resolution, $\Delta\phi$, of $10^{-3}$ radians, then the required timing accuracy t is $$\delta t = \phi/(2\pi f),$$

where f is the frequency of rotation in Hertz.
For $f = 100$ Hertz $$\delta t = 1.6 \times 10^{-6} s.$$

This timing accuracy is easily obtained with modern, solid-state electronics.

The required angular resolution also limits the maximum beam spot size on the band.

The beam diameter d on the band must be $$d < \Delta\phi R$$

where
R = shaft radius
$\Delta\phi$ = required angular resolution.

The restriction on the laser beam diameter at the focus also provides a restriction in the depth of field of the focus on the band. The depth of focus, D, is required to satisfy $$D \approx d^2/4\lambda.$$

Here $\lambda$ is the laser wavelength and d is the beam minimum diameter. Consequently, if $\Delta\phi$ is $10^{-3}$ and $R = 1$ cm, then $d < 10$ μm and $D \approx 100$ μm for $\lambda = 0.8$ μm. The method that has been described is based on the modulation of the reflectivity of a light beam by an optical pattern on the surface of the shaft. Other types of modulation are also possible. These other methods include changes in polarization by reflecting surface or changes in relative reflectivity at multiple wavelengths. These changes can be induced by optically active and interference film coatings respectively.

Multiplexing of many sensors can be achieved by sending a broad wavelength or multiple wavelength signal over an optical fiber. Each sensor would have an optical coating to select only a specific wavelength. The signals at different wavelengths would each correspond to different sensors on the shaft.

Analog detection circuits could measure the relative phase shift between two sensors. However, the preferred embodiment would be a digital scheme because it could give higher accuracy and lower cost.

The detection system can easily be calibrated under a no-load condition. This is accomplished by measuring the relative phase difference between two locations on a shaft when the shaft is rotated while disengaged from its load. The initial measurement of phase difference will be deemed to be the zero condition. Future measurements under a load condition will be offset by this amount. The detection system can then be recalibrated from time-to-time without being disassembled or returned to a service agency by disconnecting the load from the shaft.

The device and method described may be used to measure shaft rotation rate using a single sensor head. Where the distance between boundaries 14 is known, measuring any time interval from a single tape, e.g., the interval $(t_3-t_1)$ in FIG. 3, will determine the rate of rotation.

The use of a focused lens beam on a patterned band has the potential for optical misalignment as the shaft is displaced during operation of the equipment.

If the shaft translates along its own axis, there is no effect on the sensor performance. If the shaft moves toward or away from the sensor, the spot will not be at an optimum focus and the angular resolution will be less. With this geometry there is no significant change in the sensor angular resolution for such motion that is less than D, the depth of focus of lens 20. Here $D \approx R^2(\Delta\phi)^2/(4\lambda)$ with $\lambda$ the optical wavelength, R the shaft radius and $\Delta\phi$ the required angular resolution in radians.

Figure 7:
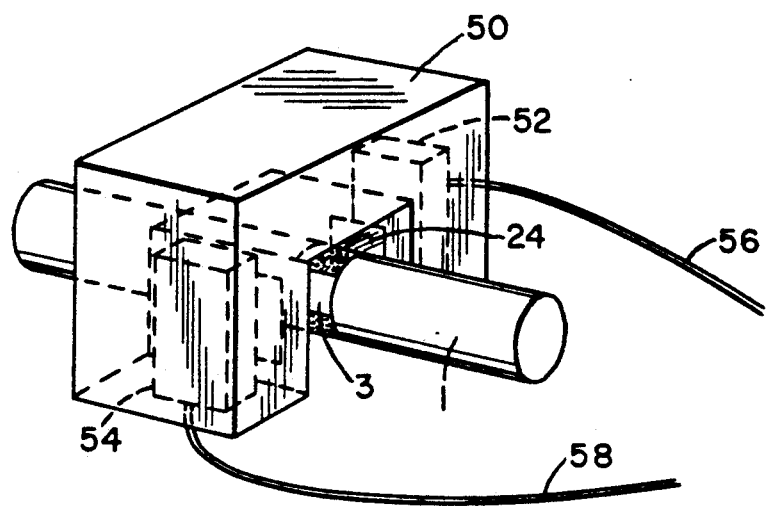
FIG. 7 is a diagrammatic view of an third alternate embodiment for detecting and compensating for shaft translation.

Up or down motion presents the most serious problem. A uniform translation of the shaft up or down is not, however, the most significant problem. Rather if the shaft moves upward at one sensor and downward at the other sensor, the relative sensor signals mimic a torsional deflection. The problem may be solved by a fourth embodiment of the invention, shown in FIG. 7. A second light source/detector pair is placed in each of the sensor heads. Each band has two corresponding pairs of light sources and detectors, one pair each on opposite sides of the shaft, with outputs 56 and 58 from detectors 52 and 54, respectively. The average of the two computed phase shifts can be used to correct for up or down shaft motion. Multiple light sources may be obtained by splitting the laser light to create two output beams, or two separate lasers may be provided.

It will be evident that there are additional embodiments which are not illustrated above but which are clearly within the scope and spirit of the present invention. The above description and drawings are therefore intended to be exemplary only and the scope of the invention is to be limited solely by the appended claims.

We claim:

1. A device for measuring torsion on a rotating shaft comprising:
    a plurality of bands, each said band comprising a plurality of regions of high and low optical reflectivity which alternate with rotation of said shaft, where boundaries between said regions are distinct and are parallel to said shaft, where each said band is disposed at a location of said shaft at which measurement is desired;
    a plurality of sensor heads, one sensor head corresponding to each said band, each sensor head comprising a laser, a detector, and at least one lens through which light from said laser is focused onto said band on said shaft and through which light reflected by the high reflectivity regions of said band as said shaft rotates is collected and focused into said detector, said laser having a beam diameter on said band less than the required angular resolution $(\Delta\phi)$ times the radius R of said shaft, and said detector converting said reflected light into an electrical signal;
    a signal processing means which receives electrical signals from each said detector, wherein said electrical signals are compared to compute and record phase displacement proportional to torsion in said rotating shaft.

2. A device for measuring torsion on a rotating shaft as in claim 1 wherein each said band comprises an adhesive tape wherein the first side of said tape is coated with an adhesive material, whereby the band is affixed to said shaft, and the second side is coated with regions of high and low optical reflectivity.

3. A device for measuring torsion on a rotating shaft as in claim 1 wherein each said band comprises paint disposed onto said shaft.

4. A device for measuring torsion on a rotating shaft as in claim 1 wherein each said band comprises an evaporated coating.

5. A device for measuring torsion on a rotating shaft as in claim 1 wherein each said band comprises a sputtered coating.

6. A device for measuring torsion on a rotating shaft as in claim 1 wherein each said band comprises high and low reflectivity regions which are etched into said shaft.

7. A device for measuring torsion on a rotating shaft as in claim 1 wherein each said band comprises high and low reflectivity regions which are milled into said shaft.

8. A device for measuring torsion on a rotating shaft as in claim 1 wherein said regions of high reflectivity are holographically patterned.

9. A device for measuring torsion on a rotating shaft as in claim 1 wherein each sensor head includes a beamsplitter disposed between said laser and said one lens so that said reflected light is deflected to said detector.

10. A device for measuring torsion on a rotating shaft comprising:
    a plurality of bands, each said band comprising a plurality of regions of high and low optical reflectivity which alternate with rotation on said shaft, where boundaries between said regions are distinct and are parallel to the axis of said shaft, where each said band is disposed at a location of said shaft at which measurement is desired;
    a plurality of sensor heads, one sensor head corresponding to each said band, each sensor head comprising a plurality of light source and detector pairs and at least one lens corresponding to each light source/detector pair through which light is focused onto said band at diametrically opposite locations of said shaft and through which light reflected by said high reflectivity regions of said band is collected and focused into said detector, said detector converting said reflected light into an electrical signal; and a signal processing means which receives electrical signals from each said detector, wherein said electrical signals are compared to compute and record phase displacement proportional to torsion in said rotating shaft.

11. A device for measuring torsion on a rotating shaft as in claim 10 wherein each said light source is a laser which has a beam diameter on a corresponding band less than the required angular resolution ($\Delta\phi$) times the radius R of said shaft.

12. A device for measuring torsion on a rotating shaft as in claim 10 wherein each said band comprises an adhesive tape wherein the first side of said tape is coated with an adhesive material, whereby the band is affixed to said shaft, and the second side is coated with regions of high and low optical reflectivity.

13. A device for measuring torsion on a rotating shaft as in claim 10 wherein each said band comprises paint disposed onto said shaft.

14. A device for measuring torsion on a rotating shaft as in claim 10 wherein each said band comprises an evaporated coating.

15. A device for measuring torsion on a rotating shaft as in claim 10 wherein each said band comprises a sputtered coating.

16. A device for measuring torsion on a rotating shaft as in claim 10 wherein each said band comprises high and low reflectivity regions which are etched into said shaft.

17. A device for measuring torsion on a rotating shaft as in claim 10 wherein each said band comprises high and low reflectivity regions which are milled into said shaft.

18. A device for measuring torsion on a rotating shaft as in claim 10 wherein said regions of high reflectivity are holographically patterned.

19. A device for measuring torsion on a rotating shaft as in claim 10 wherein an original light source for all said light sources comprises a single laser and at least one beamsplitter from which two beams are generated per beamsplitter.

20. A device for measuring torsion on a rotating shaft as in claim 10 wherein the quantity of light source/detector pairs is two.

21. A device for measuring torsion on a rotating shaft as in claim 10 wherein each light source/detector pair includes a beamsplitter disposed between said light source and said one lens so that said reflected light is deflected to said detector.

22. A device for measuring torsion on a rotating shaft as in claim 10 wherein said at least one lens corresponding to each light source/detector pair includes a first lens and a second lens and an optical fiber is disposed between said first lens and said light source, and an optical fiber is disposed between said second lens and said detector.

* * * * *